(12) United States Patent
Singh

(10) Patent No.: US 10,891,049 B1
(45) Date of Patent: Jan. 12, 2021

(54) SYSTEMS AND METHODS FOR CONTENT PREFERENCE DETERMINATION BASED ON SWIPE ANALYSIS

(71) Applicant: Rovi Guides, Inc., San Jose, CA (US)

(72) Inventor: Abhash Kumar Singh, Madhya Pradesh (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/448,269

(22) Filed: Jun. 21, 2019

(51) Int. Cl.
 G06F 3/0488 (2013.01)
 G06F 3/041 (2006.01)
(52) U.S. Cl.
 CPC ...... *G06F 3/04883* (2013.01); *G06F 3/04186* (2019.05)

(58) Field of Classification Search
 CPC .................. G06F 3/04883; G06F 3/04186
 See application file for complete search history.

(56) References Cited

U.S. PATENT DOCUMENTS

2016/0291848 A1* 10/2016 Hall .................... G06F 3/04817
2018/0276543 A1* 9/2018 Parrotta, Jr. ............ G06F 3/017

\* cited by examiner

*Primary Examiner* — Charles V Hicks
(74) *Attorney, Agent, or Firm* — Haley Guiliano LLP

(57) ABSTRACT

Systems and methods are disclosed for determining a preference for content based on swipe characteristics. A swiping application may present a user with a content identifier on a touchscreen display. Based on the user's touch-based interaction with the content identifier (e.g., the speed at which the user swipes the content identifier away, the angle and direction of the user's swipe gesture, and any halt time in the swipe gesture), the swiping application assigns a preference level to the content identifier.

18 Claims, 9 Drawing Sheets

800

| | Positive 1 | Positive 2 | Negative 1 | Negative 2 |
|---|---|---|---|---|
| Swipe Duration | 2 seconds | 4 seconds | 2 seconds | 4 seconds |
| Swipe Direction | 10 degrees | 25 degrees | 10 degrees | 25 degrees |
| Swipe Halt Time | 2 seconds | 4 seconds | 2 seconds | 4 seconds |
| Preference Level | 0.5 + 0.1 + 0.5 = 1.1 | 0.25 + 0.04 + 0.25 = 0.54 | -1*(0.5 + 0.1 + 0.5) = -1.1 | -1*(0.25 + 0.04 + 0.25) = -0.54 |

FIG. 8

SYSTEMS AND METHODS FOR CONTENT PREFERENCE DETERMINATION BASED ON SWIPE ANALYSIS

BACKGROUND

The present disclosure is directed to touch-based user interfaces, and more particularly to swiping applications that analyze swipe characteristics to determine user preferences.

SUMMARY

Some applications build their user preference databases by presenting users with images that can be swiped away in two directions, one direction indicating a "like" and the other direction indicating a "dislike." For example, a movie streaming application may present a new user with several movie posters to determine which movies the user likes to watch. On a touch-based interface, the user may use a stylus or his/her fingers to swipe away the movie posters according to preference. The binary data gathered from the user's swipes may not accurately represent the user's preferences however. Regardless of whether the user is presented with his/her all-time favorite movie or an average movie that the user would not mind watching, the user will swipe towards the "like" direction. The degree to which the user prefers an item is not considered. Although the solution may appear to be to rely on a rating system with more than a "like" or "dislike" option, a more appropriate solution is to analyze the swiping characteristics of the user. Detecting user hesitation to "dislike" an item or a slow swipe gesture may indicate that the user still prefers the item in contrast to another item that the user dismisses quickly without any signs of indecision.

Systems and methods for determining a preference for content based on swipe characteristics are thus described herein. In at least one embodiment, a swiping application generates for display a content identifier on a touchscreen. The swiping application detects user contact at a first point on the touchscreen displaying the content identifier. While the user contact is maintained on the touchscreen, the swiping application detects an initiation of a swipe gesture to a second point on the touchscreen. Completion of the swipe gesture occurs upon release of the user contact. The completion may activate an action such as the removal of the content identifier from display, a shift of the content identifier to a different position on the touch screen, the display of metadata relating to the content identifier, etc. The swiping application further determines whether the swipe gesture has been temporarily halted (e.g., the user has stopped swiping momentarily). The temporary halting of the swipe gesture may indicate that the user is hesitating to dismiss the content identifier. In response to determining that the swipe gesture has been temporarily halted, the swiping application assigns to the content identifier a preference level that is a function of an amount of time the swipe gesture is halted. This assignment may also occur subsequent to the swiping application detecting the release of the user contact from the touchscreen.

The swiping characteristic in the previous embodiment is focused on user hesitation (e.g., the user initiates a swiping gesture, but halts the gesture temporarily). In some embodiments, the swiping characteristic considered by the swiping application may be swipe direction. For example, the swiping application determines an angle formed by a first vector from the first point to the second point and a second vector from one midpoint of the touchscreen's edge to another midpoint of a parallel edge. In this case, the higher the angle, the more hesitant the user may be in dismissing the content identifier. Accordingly, the swiping application determines the preference level as a function of both the swipe direction and the amount of time the swipe gesture is halted. In the previous examples, swiping towards a first edge of the touchscreen indicates a positive preference for a content identifier and swiping towards a second edge of the touchscreen indicates a negative preference. In response to determining that the swipe direction is towards the first edge, the swiping application may further increase the preference level by a threshold amount.

Another swiping characteristic that the swiping application may consider is the swipe duration, which represents a time difference between when the user contact is initiated at the first point and when the user contact is released from the second point. Accordingly, the swiping application determines a preference level that is a function of the swipe duration, the swipe direction, and the amount of time the swipe gesture is halted. It should be noted that in various embodiments, the preference level may be a function of all three swiping characteristics, a function of individual swiping characteristics, or a function of any combination of swiping characteristics.

The swiping application may further store the preference level of the content identifier in a data structure featuring a plurality of preference levels for a plurality of content identifier. This data structure may be sorted by the swiping application according to preference levels and may be used to generate content recommendations. In some embodiments, the swiping application receives a request for a content recommendation. The swiping application identifies, in the data structure, a second content identifier that has a second preference level and determines whether the first preference level is greater than the second preference level. In response to determining that the first preference level is greater than the second preference level, the swiping application generates for display the first content identifier as the content recommendation.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 shows an illustrative example of a data structure featuring swipe gestures and their associated characteristics, in accordance with some embodiments of the disclosure.

DETAILED DESCRIPTION

Figure 1:
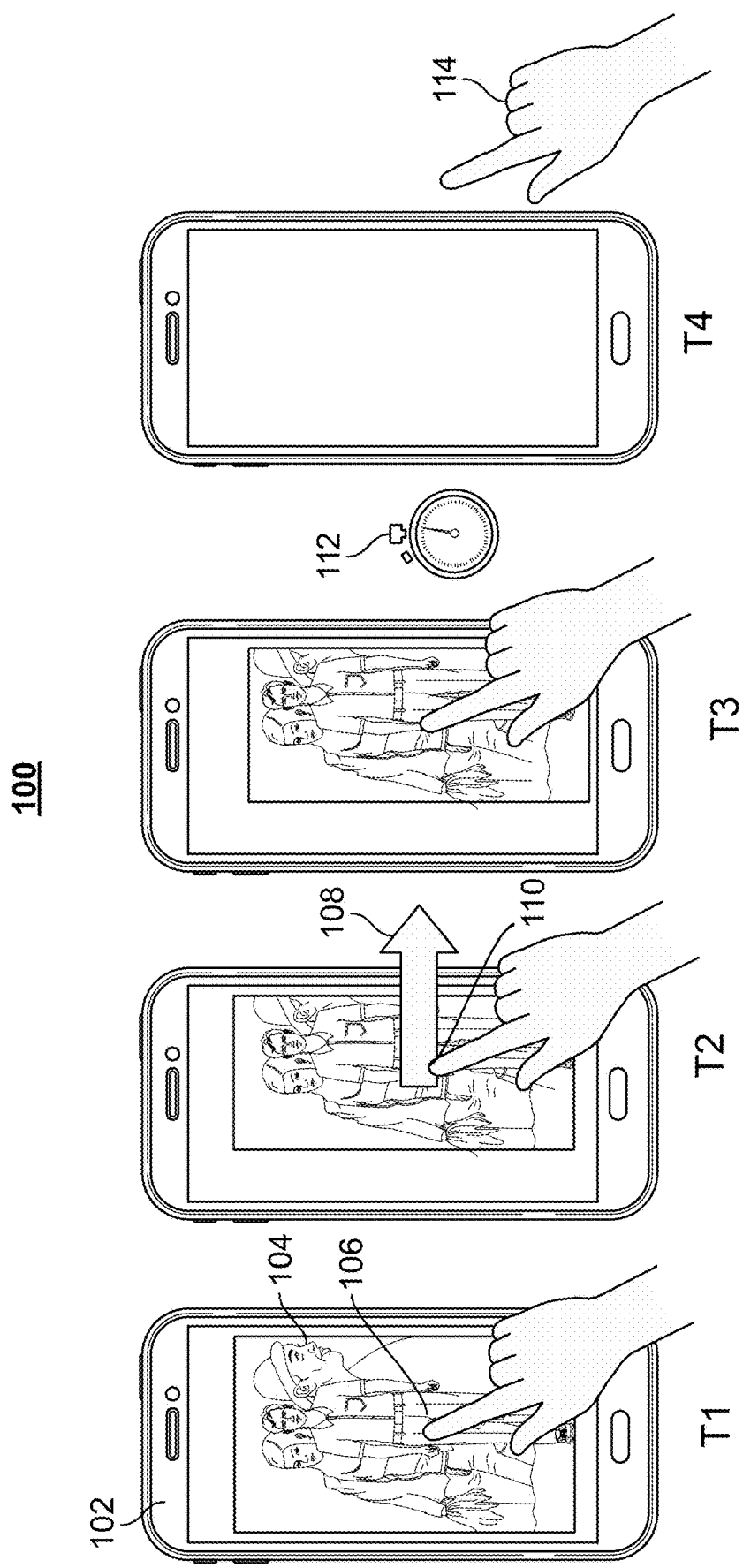
FIG. 1 shows an illustrative example of determining a preference level of a content identifier based on the amount of time a swipe gesture is halted, in accordance with some embodiments of the disclosure.

FIG. 1 shows illustrative example 100 of determining a preference level of a content identifier based on the amount of time a swipe gesture is halted, in accordance with some embodiments of the disclosure. Applications that rely on binary classes (e.g., "like" or "dislike") to determine user preferences may rely on touch-based inputs such as swiping right or left. Although binary classes may provide profile building applications with a quick overview of the user's preferences, such classes fail at describing the degree to which the user prefers or does not prefer a presented item. This degree can in fact be determined, however, by analyzing the user's touch inputs on a device.

In example 100, a swiping application presents content identifier 104 (e.g., a movie poster) on a touchscreen of device 102 (e.g., a smartphone). The user has the ability to swipe content identifier 104 away or select content identifier 104 in order to view the movie and/or acquire additional movie details. At time T1, the swiping application detects user contact at point 106 on the touchscreen displaying the content identifier. While the user contact is maintained on the touchscreen, at time T2 (after time T1 and before T3), the swiping application detects an initiation of swipe gesture 108 to point 110 on the touchscreen. A swipe gesture is a singular motion in which contact is initiated at a first point on the touch screen and released at a second point away from the first point. For example, the user may slide his/her finger from point 106 to point 110. The swiping application detects this as an initiation of swipe gesture and animates content identifier 104 as being dragged by the user's finger as it travels from point 106 to point 110. The swipe gesture is completed upon release of the user contact and the completion may remove the content identifier from display or may move the content identifier to a different position on the touchscreen. Should the user contact return back to point 106 from point 110 and be released, the swipe gesture is cancelled. This is because the release occurs at the same point at which the swipe gesture was initiated.

At time T3 (before T4 and after T2), the swiping application determines that the swipe gesture has been temporarily halted (e.g., the user has stopped swiping momentarily). The temporary halting of the swipe gesture may indicate that the user is hesitating to dismiss the content identifier. This hesitation is an important characteristic of the swipe gesture because it implies that unlike content identifiers that the user can immediately dismiss, content identifier 104 may still be of interest to the user. The user provides a binary input in which content identifier 104 can either be selected, which indicates a positive preference for content identifier 104, or content identifier 104 can be dismissed, which indicates a negative preference for content identifier 104. While a swiping application can determine the user's basic binary preferences (e.g., like or dislike), the temporary halting of the swipe gesture offers greater insight into the user's degree of preference and does so without the express request to rate content identifier 104 on a larger scale (e.g., rate from 1-10).

The swiping application determines that the swipe gesture has been temporarily halted by monitoring the amount of time that user contact is maintained at a point on the touchscreen. In response to determining that the user contact has been maintained at a given point for more than a threshold period of time 112 (e.g., 1 second), the swiping application determines that the swiping gesture has been halted. For example, the user contact may be maintained at point 110 for 2 seconds. Because 2 seconds is greater than the threshold period of time 112, the swiping application determines that the swipe gesture has been halted.

In response to determining that the swipe gesture has been temporarily halted, the swiping application assigns, to content identifier 104, a preference level that is a function of an amount of time the swipe gesture is halted. For example, the user may maintain contact at point 110 for 3 seconds before release 114 of user contact from the touchscreen. The preference level may be a qualitative (e.g., very low, low, medium, high, very high) or a quantitative value (e.g., between 1 to 10). Suppose that the user contact is maintained at point 110 for 5 seconds. The swiping application may map this value to a preference level. The table below is an example of a data structure that the swiping application may reference to determine such preference levels.

TABLE 1

Halt Time and Preference Level Mapping

| Halt Time | Preference Level |
|---|---|
| <1 second | Low |
| =<4 seconds and >=1 seconds | Medium |
| >4 seconds | High |

According to the table above, because the user contact was halted at point 110 for 5 seconds, the preference level for content identifier 104 is "High." In a quantitative embodiment, the swiping application assigns a number equal to the value of the halt time as the preference level. For example, because the halt time is 5 seconds, the swiping application assigns a preference level of "5" to content identifier 104. It should be noted that release 114 signals the completion of swipe gesture 108. Accordingly, the assignment may also occur subsequent to the swiping application detecting release 114 of the user contact from the touchscreen at time T4 (after time T3).

Another swiping characteristic that the swiping application may consider is the swipe duration. The swipe duration represents the amount of time between when user contact is initiated on the touchscreen and when user contact is released. Referring to example 100, the swipe duration is the difference between time T4 and time T1. Suppose that T1 is 12:01:00 am and T4 is 12:01:03 am. The swiping application determines that there is a 3 second difference between T1 and T4. In example 100, content identifier 104 may either be selected or swiped away. A selection of content identifier 104 indicates a positive preference and a swipe gesture in any direction indicates a negative preference. Therefore, for any swipe gesture, the longer it takes for the user to complete the swipe gesture, the greater the preference for content identifier 104. The swiping application thereby assigns a preference level that is proportional to the swipe duration (e.g., 3 seconds) to content identifier 104. The table below is an example of a data structure that the swiping application may reference to determine such preference levels.

TABLE 2

| Swipe Duration and Preference Level Mapping | |
|---|---|
| Swipe Duration | Preference Level |
| <1 second | Low |
| =<4 seconds and >=1 seconds | Medium |
| >4 seconds | High |

According to the table above, because the swipe duration is 3 seconds, the preference level for content identifier 104 is "Medium." In a quantitative embodiment, the swiping application assigns a number equal to the value of the swipe duration as the preference level. For example, because the swipe duration is 3 seconds, the swiping application assigns a preference level of "3" to content identifier 104. In some embodiments, the swipe direction may be inversely proportional to the preference level. For example, if the swiping gesture is made in a direction that indicates a positive preference, the faster the swipe gesture is completed, the greater the preference for the content identifier. This is discussed in further detail in the description of FIG. 8.

Figure 2:
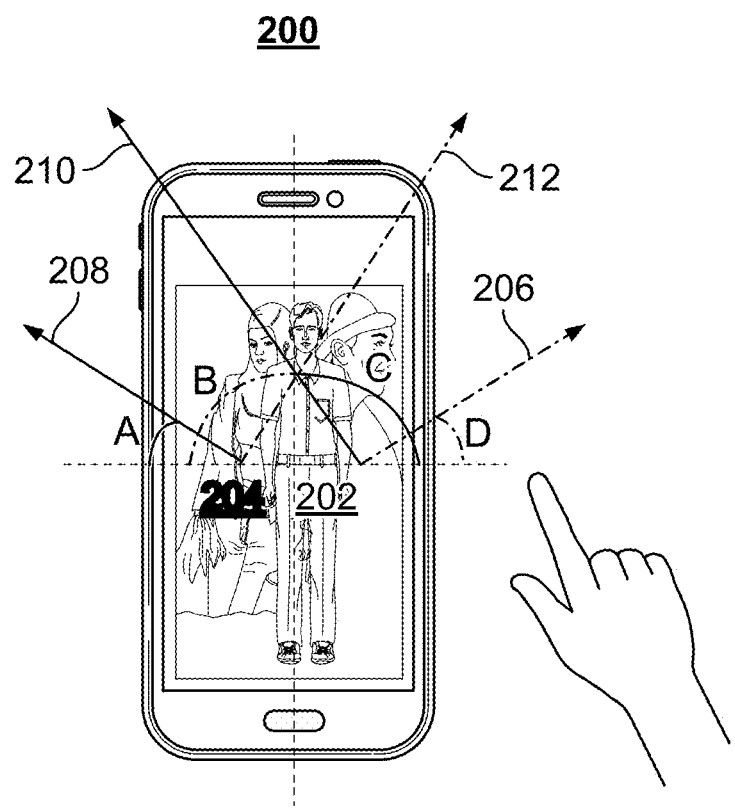
FIG. 2 shows an illustrative example of determining a swipe direction, in accordance with some embodiments of the disclosure.

FIG. 2 shows illustrative example 200 of determining a swipe direction, in accordance with some embodiments of the disclosure. The swiping characteristic in the previous embodiment is focused on user hesitation (e.g., the user initiates a swiping gesture, but halts the gesture temporarily). In example 200, the swiping characteristic considered by the swiping application is swipe direction. The swipe direction can be expressed in terms of an angle and/or a vector. The swiping application may detect user contact at point 202, followed by a swipe gesture along vector 206. The dashed lines in example 200 represent the midpoint lines of the touchscreen. The swiping application determines angle D between vector 206 and the horizontal midpoint line. As the magnitude of angle D approaches 0 degrees, the swiping application determines that the user is more confident in their decision to dismiss content identifier 104. As the magnitude of angle D approach 90 degrees, the swiping application determines the greater the hesitation to dismiss content identifier 104. Accordingly, the swiping application determines the preference level as a function of the angle between vector 206 and the horizontal midpoint line. For example, angle D may be 20 degrees. The swiping application may map this value to a preference level. As mentioned previously, in example 100, a selection of content identifier 104 indicates a positive preference and a swipe gesture in any direction indicates a negative preference. For any swipe gesture, the larger the angle associated with the swipe direction, the greater the preference for content identifier 104. The table below is an example of a data structure that the swiping application may reference to determine such preference levels.

TABLE 3

| Angle and Preference Level Mapping | |
|---|---|
| Angle | Preference Level |
| =>0 degrees and <30 degrees | Low |
| =>30 degrees and <60 degrees | Medium |
| =>60 degrees and <90 degrees | High |

According to the table above, because angle D is 20 degrees, the preference level for content identifier 104 is "Low," thereby indicating that the user is confident in dismissing content identifier 104. In a quantitative embodiment, the swiping application assigns a number equal to the value of the angle as the preference level. For example, because angle D is 20 degrees, the swiping application assigns a preference level of "20" to content identifier 104. In some embodiments, the swipe direction may be inversely proportional to the preference level. For example, if the swiping gesture is made in a direction that indicates a positive preference, the smaller the angle, the greater the preference for the content identifier. This is discussed in further detail in the description of FIG. 8.

In some embodiments, swiping towards a first edge of the touchscreen indicates a positive preference for content identifier 104 and swiping towards a second edge of the touchscreen indicates a negative preference. In example 200, swiping towards the left edge of the touchscreen may indicate a positive preference and swiping towards the right edge of the touchscreen may indicate a negative preference. As depicted, the swiping application may detect user contact at point 202, followed by the initiation of a swipe gesture along vector 210. The swiping application subsequently determines angle C between vector 210 and the horizontal midpoint line. The table below is an example of a data structure that the swiping application may reference to determine a preference level for a swipe gesture initiated from the right half of the touchscreen.

TABLE 4

| Right-Side Angle and Preference Level Mapping | |
|---|---|
| Angle | Preference Level |
| =>0 degrees and <45 degrees | Very Low |
| =>45 degrees and <90 degrees | Low |
| >90 degrees and <135 degrees | High |
| =>135 degrees and <=180 degrees | Very High |

As depicted, vector 210 is pointing towards the left edge of the screen. Suppose that angle C is 120 degrees. The swiping application determines, based on a lookup in this table, that the preference level for content identifier 104 is "High." Because swiping to the left edge of the touchscreen implies that the user prefers content identifier 104, the swiping application will assign a higher preference level to content identifier 104 as opposed to if the swiping application detected a swipe gesture towards the right edge of the touchscreen. The closer a vector of a swipe gesture is to being parallel with the horizontal midpoint line, the less hesitant the user may be in his/her decision. The swiping application thus determines the angle between the vector of the swipe gesture and the horizontal midpoint line.

The swiping application may detect user contact at point 204 on the touchscreen, followed by the initiation of a swipe gesture along vector 208 or vector 212. Because vector 208 and vector 210 are angled towards the left edge of the touchscreen (indicating a positive preference), the relationship between angle A (or angle B) and the preference level is inversely proportional. As a result, the larger angle A (or angle B) is, the lower the preference level will be. In a quantitative embodiment, if angle A is 20 degrees, for example, the swiping application assigns a preference level that is the reciprocal of the numerical value of angle B (1/20). If angle A is 180 degrees, vector 208 faces the right edge of the touchscreen (associated with the negative preference). The swiping application assigns a preference level of 1/180 to content identifier 104. This value is less than 1/20, which is expected for a swipe gesture towards the right edge of the touchscreen. The table below is an example of a data structure that the swiping application may reference to determine a preference level for a swipe gesture initiated from the left half of the touchscreen.

TABLE 5

Left-Side Angle and Preference Level Mapping

| Angle | Preference Level |
|---|---|
| =>0 degrees and <45 degrees | Very High |
| =>45 degrees and <90 degrees | High |
| >90 degrees and <135 degrees | Low |
| =>135 degrees and <=180 degrees | Very Low |

As depicted, vector 208 is pointing towards the left edge of the screen. Suppose that angle A is 20 degrees. The swiping application determines, based on a lookup in this table, that the preference level for content identifier 104 is "Very High."

The swiping application may also determine a preference level that is a function of the swipe duration, the swipe direction, and the amount of time the swipe gesture is halted. It should be noted that in various embodiments, the preference level may be a function of all three swiping characteristics, a function of individual swiping characteristics, or a function of any combination of swiping characteristics.

Figure 3:
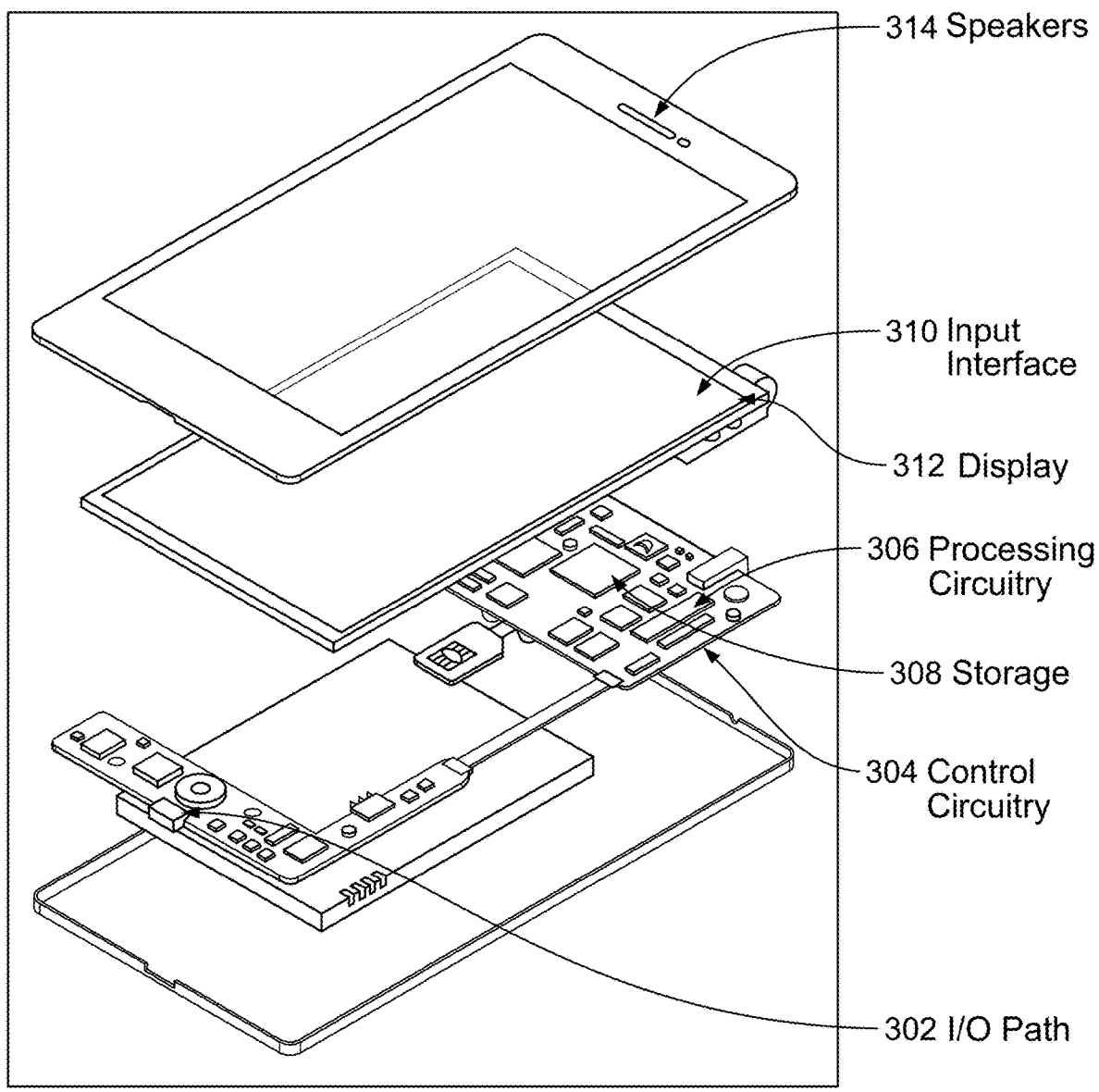
FIG. 3 is a diagram of an illustrative media device in accordance with some embodiments of the disclosure.

FIG. 3 shows a generalized embodiment of illustrative device 300. As depicted in FIG. 3, device 300 is a smartphone. However, device 300 is not limited to smartphones and may be any computing device. For example, device 300 of FIG. 3 can be implemented in system 400 of FIG. 4 as device 402 (e.g., a smartphone, a tablet, a computer, or any combination thereof).

Device 300 may receive data via input/output (hereinafter I/O) path 302. I/O path 302 may provide received data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communication paths (described below). I/O functions may be provided by one or more of these communication paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a interaction analyzer stored in memory (i.e., storage 308).

A interaction analyzer may be a stand-alone application implemented on a device or a server. The swiping application may be implemented as software or a set of executable instructions. The instructions for performing any of the embodiments discussed herein of the swiping application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 3 the instructions may be stored in storage 308, and executed by control circuitry 304 of a device 300.

In some embodiments, a swiping application may be a client-server application where only the client application resides on device 300 (e.g., device 402), and a server application resides on an external server (e.g., server 406). For example, a swiping application may be implemented partially as a client application on control circuitry 304 of device 300 and partially on server 406 as a server application running on control circuitry. Server 406 may be a part of a local area network with device 402 or may be part of a cloud computing environment accessed via the Internet. In a cloud computing environment, various types of computing services for performing searches on the Internet or informational databases, providing storage (e.g., for swipe direction, duration, and halt time entries) or parsing data are provided by a collection of network-accessible computing and storage resources (e.g., server 406), referred to as "the cloud." Device 300 may be a cloud client that relies on the cloud computing capabilities from server 406 to generate preference levels of the swiping application. When executed by control circuitry of server 406, the swiping application may instruct the control circuitry to generate the swiping application output (e.g., the assigned preference levels) and transmit the generated output to device 402. The client application may instruct control circuitry of the receiving device 402 to generate the swiping application output. Alternatively, device 402 may perform all computations locally via control circuitry 304 without relying on server 406.

Control circuitry 304 may include communications circuitry suitable for communicating with a swiping application server or other networks or servers. The instructions for carrying out the above-mentioned functionality may be stored and executed on server 406. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 406) may be used to supplement storage 308 or instead of storage 308.

A user may send instructions to control circuitry 304 using user input interface 310 of device 300. User input interface 310 may be any suitable user interface touchscreen, touchpad, stylus and may be responsive to external device add-ons such as a remote control, mouse, trackball, keypad, keyboard, joystick, voice recognition interface, or other user input interfaces. Display 310 (also referred to as display circuitry) may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. Speakers 314 may be provided as integrated with other elements of user equipment device 300 or may be stand-alone units. An audio component of content displayed on display 312 may be played through speakers 314. In some embodiments, the audio may be distributed to a receiver (not shown), which processes and outputs the audio via speakers 314.

Control circuitry 304 may allow a user to provide user profile information or may automatically compile user profile information. For example, control circuitry 304 may monitor touchscreen interactions of the user across multiple devices associated with a user profile. Control circuitry 304 may store the preference level assignments in a server linked to the user profile. Additionally, control circuitry 304 may obtain all or part of other user profiles that are related to a particular user (e.g., via social media networks), and/or obtain information about the user from other sources that control circuitry 304 may access. As a result, a user can be provided with a unified experience across the user's different devices.

Figure 4:
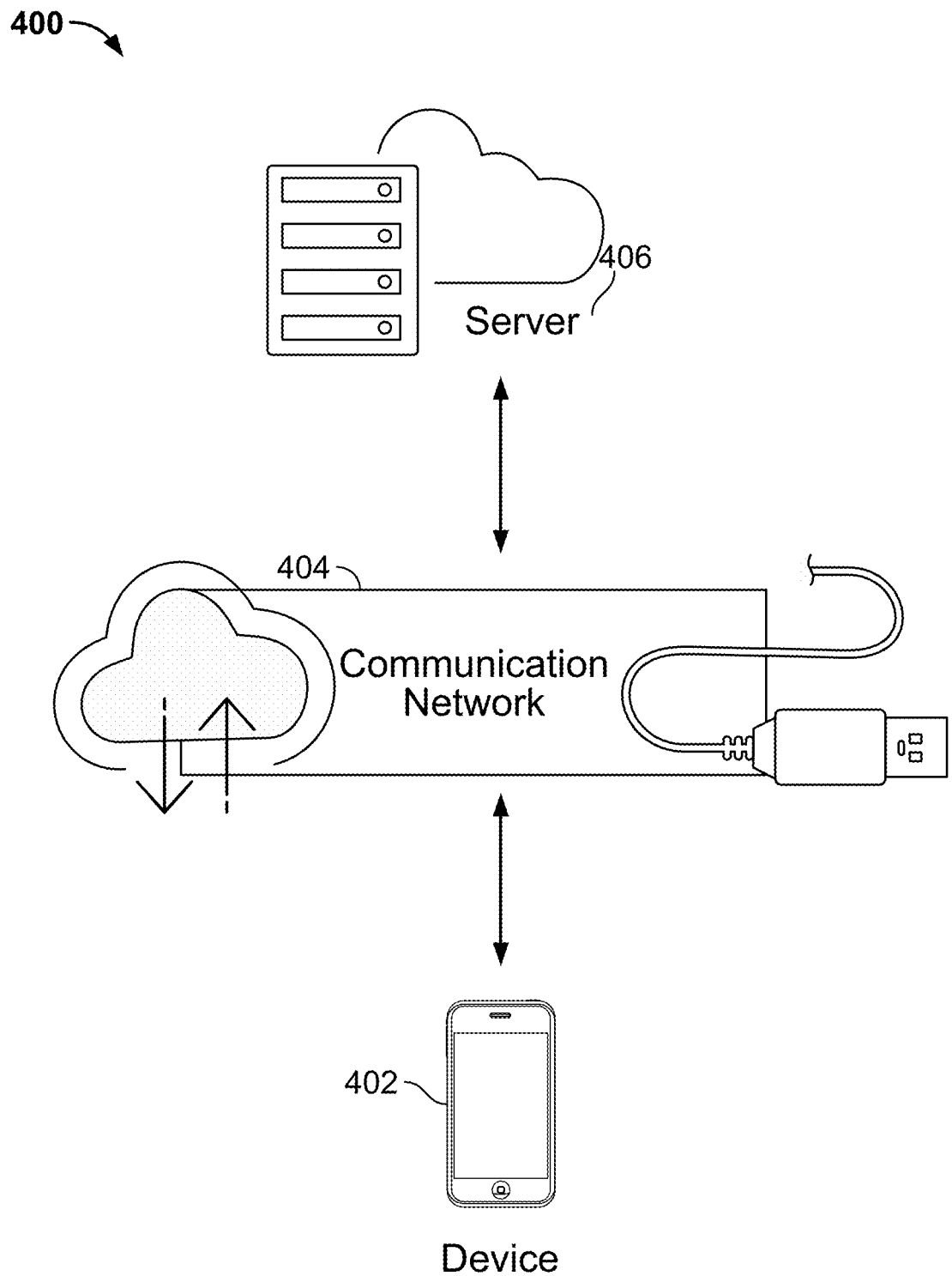
FIG. 4 is a diagram of an illustrative media system in accordance with some embodiments of the disclosure.

As depicted in FIG. 4, device 402 may be coupled to communication network 404. Communication network 404 may be one or more networks including the Internet, a mobile phone network, mobile voice or data network (e.g., a 4G or LTE network), cable network, public switched telephone network, Bluetooth, or other types of communications network or combinations of communication network. Thus, device 402 may communicate with server 406 over communication network 404 via communications circuitry described above. In should be noted that there may be more than one server 406, but only one is shown in FIG. 4 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths.

Figure 5:
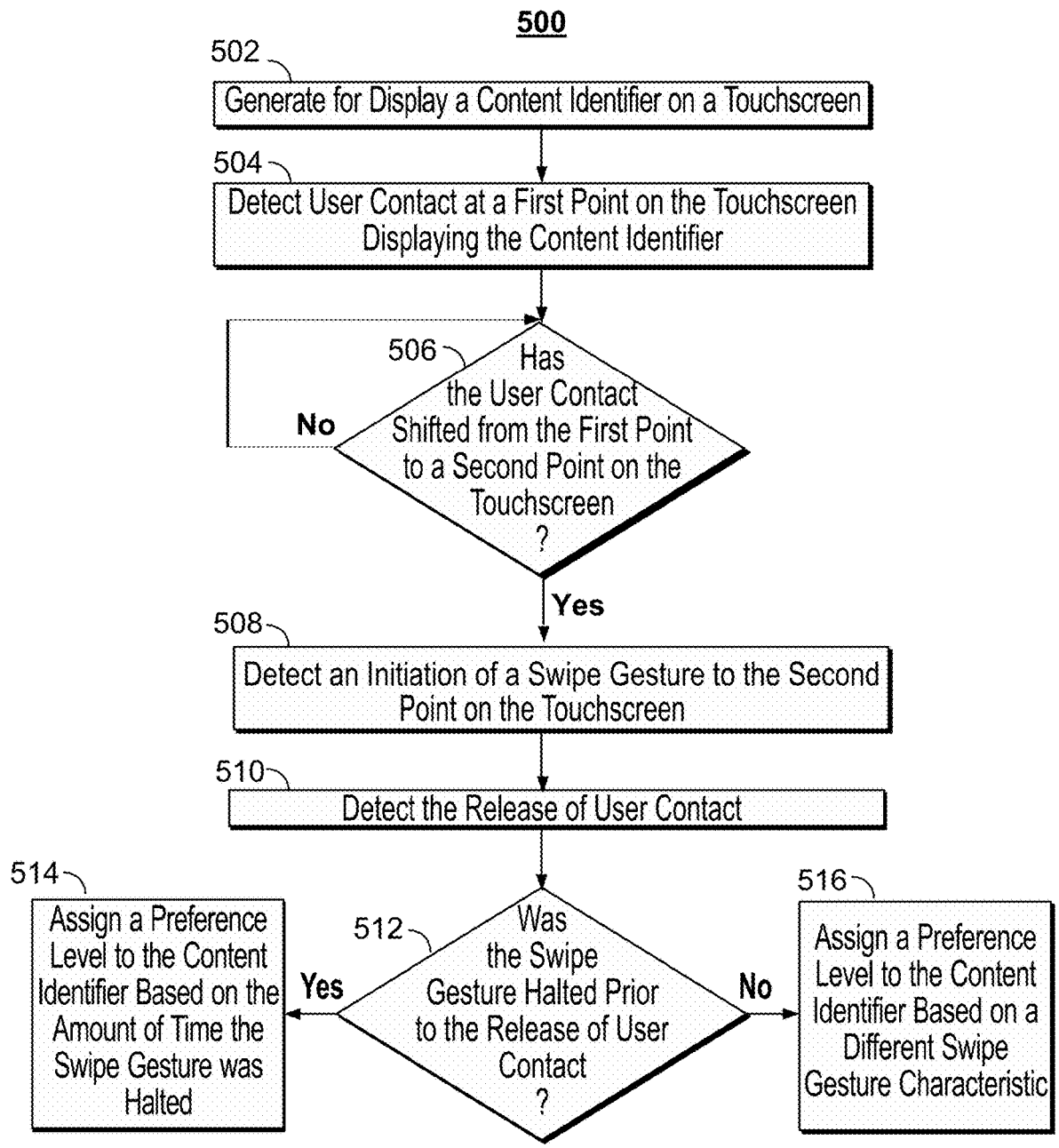
FIG. 5 is a flowchart of an illustrative process for assigning a preference level to the content identifier based on a swipe gesture characteristic, in accordance with some embodiments of the disclosure.

FIG. 5 is a flowchart of illustrative process 500 for assigning a preference level to the content identifier based on a swipe gesture characteristic, in accordance with some embodiments of the disclosure. At 502, control circuitry 304 generates for display a content identifier, such as content identifier 104 from example 100, on a touchscreen (e.g., on display 312 integrated with input interface 310). At 504, control circuitry 304 detects (e.g., via input interface 310) user contact at a first point (e.g., point 106) on the touchscreen displaying the content identifier. At 506, control circuitry 304 determines whether the user contact shifted from the first point to a second point on the touchscreen. For example, control circuitry 304 may determine that while user contact is maintained on display 312, the user contact is sliding across the touchscreen to a different point (e.g., point 110).

In response to determining that the user contact has not shifted, process 500 returns to 506 and control circuitry 304 monitors for a shift to a second point. In some embodiments, control circuitry 304 may process the contact at the first point without a subsequent swipe gesture as a selection of the content identifier. For example, control circuitry 304 may detect the initiation of user contact at point 106 and a subsequent release at point 106. Because the user contact did not slide (indicating the initiation of a swipe gesture, control circuitry 304 classifies the user contact as making a selection. Control circuitry 304 thus assigns a preference level to the content identifier based on the selection. For example, control circuitry 304 retrieves from storage 308 a predetermined preference level value for all content identifiers that have been selected. In a quantitative embodiment, this predetermined preference level value may be 100 out of a possible 100 preference points. In a qualitative embodiment, the predetermined preference level value may be "Very High."

If, at 506, control circuitry 304 determines that the user contact has shifted from the first point to the second point, process 500 proceeds to 508, where control circuitry 304 detects an initiation of a swipe gesture to the second point on the touchscreen. At 510, control circuitry 304 detects the release of user contact. For example, in response to detecting the swipe gesture, control circuitry 304 analyzes the properties of the swipe gesture. Such properties include the position of the user contact on input interface 310 and the time at which contact was initiated at a respective position. Control circuitry 304 generates a data structure to record the determined properties. An exemplary data structure with the determined properties is shown below. This data structure may be stored on server 406 (e.g., retrievable over communication network 404) or in storage 308 of device 402.

TABLE 6

Swipe Tracker Data Structure

| Position | Time at Position (hour:minute:second:millisecond) |
| --- | --- |
| Point 1 (x1, y1) | 12:00:00:000 |
| Point 2 (x2, y2) | 12:00:00:60 |
| . . . | . . . |
| Point 99 (x99, y99) | 12:00:02:000 |
| Point 100 (x100, y100) | 12:00:04:000 |
| Release | 12:00:04:500 |

The coordinates (x,y) represent the approximate center pixel that is touched by the user's stylus or finger. For example, the user may initiate user contact using his/her finger.

Control circuitry 304 determines the pixels on input interface 310 that are touched. In a simplistic example, the surface area of the finger's tip that touches input interface 310 may be interpreted by control circuitry 304 as a circle with a radius of 20 pixels. Control circuitry 304 determines the center point of the circle and records it in the data structure (e.g., (x1, y1). Furthermore, because point 100 is the last entry in the example data structure, control circuitry 304 determines that the release of user contact from input interface 310 occurred at point 100.

At 512, control circuitry 304 determines whether the swipe gesture was halted prior to the release of the user contact. In order to determine whether the swipe gesture was halted, control circuitry 304 refers to the data structure previously presented and determines whether the time at a particular position is greater than a threshold period of time. The threshold period of time is retrieved by control circuitry 304 from storage 308 of server 406 (e.g., via communication network 404) or device 402. In one example, the threshold period of time may be 1.5 seconds. Control circuitry 304 determines that user contact was maintained at position 99 for 2 seconds because user contact was initiated on point 99 at 12:00:02:000 and was initiated on point 100 two seconds later. As this value is greater than the threshold period of time, control circuitry 304 determines that the swipe gesture was halted prior to the release of user contact.

In response to determining that the swipe gesture was halted, process 500 proceeds to 514, where control circuitry 304 assigns a preference level to the content identifier based on the amount of time the swipe gesture was halted. For example, control circuitry 304 may determine the numerical value from "2 seconds" (i.e., 2) and may assign it to the content identifier as its preference level. Control circuitry 304 may also determine a multiple of the numerical value (e.g. 4, 6, 8, etc.) to assign to the content identifier as the preference level. In response to determining that the swipe gesture was not halted, process 500 proceeds to 516, where control circuitry 304 assigns a preference level to the content identifier based on a different swipe gesture characteristic (e.g., swipe duration and/or swipe direction). This is further discussed in process 600.

Figure 6:
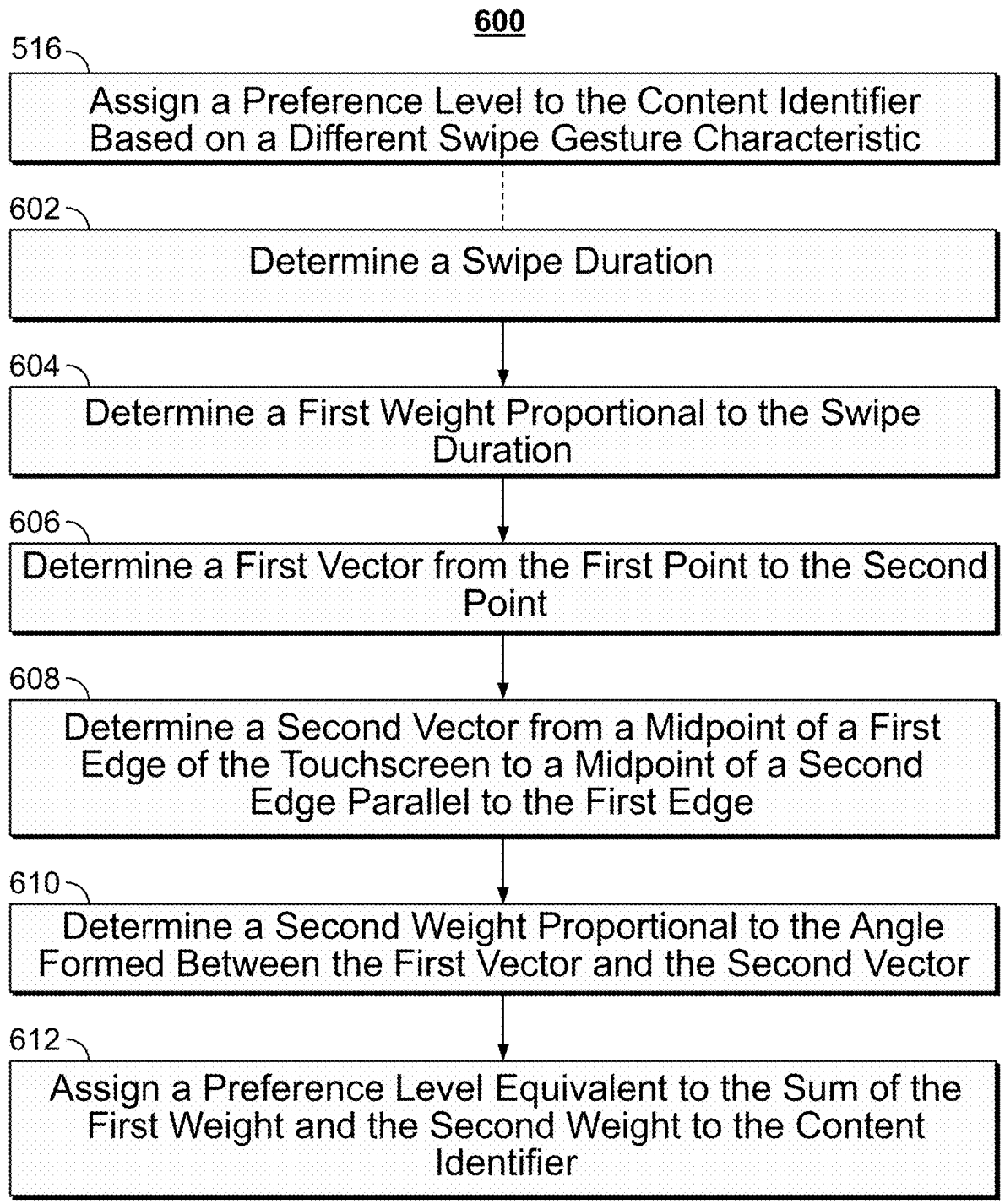
FIG. 6 is a flowchart of an illustrative process for assigning a preference level to the content identifier based on swipe direction and swipe duration, in accordance with some embodiments of the disclosure.

FIG. 6 is a flowchart of illustrative process 600 for assigning a preference level to the content identifier based on swipe direction and swipe duration, in accordance with some embodiments of the disclosure. Process 600 elaborates on 516 of process 500. At 602, control circuitry 304 determines a swipe duration of the time it took release user contact from input interface 310 subsequent to initiating user contact at the first point. Referring to table 6, the first point is point 1 and the second point is 100 (after which the user contact was released). Control circuitry 304 determines that the swipe duration between when the user contact was initiated at point 1 (e.g., 12:00:00:000) and when the user contact was released from a different point on input interface 310, such as point 100 (e.g., release at 12:00:04:500), is 4.5 seconds. At 604, control circuitry 304 determines a first weight proportional to the swipe duration. For example, control circuitry 304 determines the numerical value of the swipe duration (e.g., 4.5) as the first weight.

At 606, control circuitry 304 determines a first vector from the first point to the second point. Referring to table 6, control circuitry 304 may determine the difference between the coordinates to express the first vector (e.g., $v_1=(x100-x1)*x_v+(y100-y_1)*y_v$, where $v_1$ is the first vector, $x_v$ is the x-unit vector and $y_v$ is the y-unit vector). At 608, control circuitry 304 determines a second vector from a midpoint of a first edge of the touchscreen to a midpoint of a second edge parallel to the first edge (e.g., the x-unit vector). At 610, control circuitry 304 determines a second weight proportional to the angle formed between the first vector and the second vector. For example, control circuitry 304 may determine that the angle between the first and second vector is 20 degrees and determine the second weight to be equivalent to the numerical value of the angle (i.e., 20). At 612, control circuitry 304 assigns a preference level equivalent to the sum of the first weight and the second weight to the content identifier. For example, control circuitry 304 may add 4.5 and 20 to determine a preference level of 24.5. In some embodiments, control circuitry 304 may adjust the magnitude of each weight to prevent one swipe characteristic from having a larger influence in the preference level determination than another swipe characteristic. For example, control circuitry 304 may retrieve from storage 308, a predetermined swipe duration multiplier (e.g., 2.0) and a predetermined swipe direction multiplier (0.5). Control circuitry 304 determines the preference level to be a sum of the first weight multiplied by the swipe duration multiplier and the second weight multiplied by the swipe direction multiplier (e.g., 4.5*2+20*0.5=19).

Figure 7:
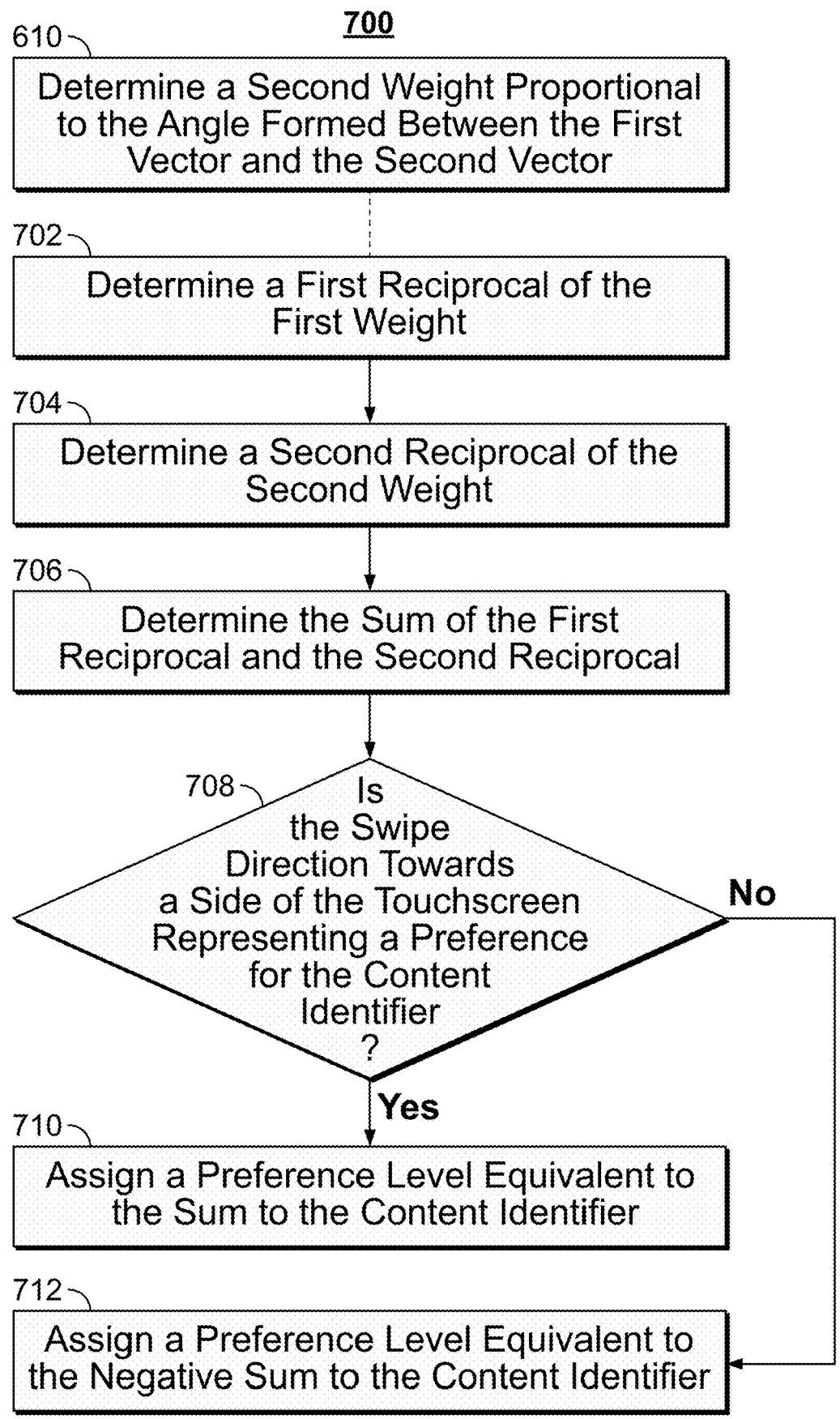
FIG. 7 is a flowchart of an illustrative process for assigning a preference level to the content identifier based on whether a swipe was made in a positive or negative direction, in accordance with some embodiments of the disclosure.

FIG. 7 is a flowchart of illustrative process 700 for assigning a preference level to the content identifier based on whether a swipe was made in a positive or negative direction, in accordance with some embodiments of the disclosure. Process 700 elaborates on 610 of process 600. At 702, control circuitry 304 determines a first reciprocal of the first weight. For example, if the first weight is 4, the reciprocal of the first weight is 0.25. At 704, control circuitry 304 determines a second reciprocal of the second weight. For example, if the second weight is 10, the reciprocal of the second weight is 0.10. At 706, control circuitry 304 determines the sum of the first reciprocal and the second reciprocal (e.g., 0.25+0.1=0.35).

At 708, control circuitry 304 determines whether the swipe direction is towards aside of the touchscreen representing a preference for the content identifier. For example, swiping towards the left edge of display 310 may indicate a positive preference for the content identifier and swiping towards the right edge of display 310 may indicate a negative preference for the content identifier. In response to determining that the swipe direction is towards a side of the touchscreen representing a preference for the content identifier (e.g., the left edge), at 710, control circuitry 304 assigns a preference level equivalent to the sum of the reciprocals to the content identifier. For example, control circuitry 304 assigns 0.35 to the content identifier. In response to determining that the swipe direction is not towards a side of the touchscreen representing a preference for the content identifier (e.g., the right edge), at 712, control circuitry 304 assigns a preference level equivalent to the negative sum of the reciprocals to the content identifier. For example, control circuitry 304 assigns −0.35 to the content identifier.

FIG. 8 shows illustrative example 800 of a data structure featuring swipe gestures and their associated characteristics, in accordance with some embodiments of the disclosure. Control circuitry 304 stores this data structure in storage 308 of server 406 (e.g., accessible via communications network 404) and/or device 402. The data structure has recorded four different swipe gestures (positive 1, positive 2, negative 1, and negative 2). These swipe gestures can be mapped to example 200 where positive 1 is associated with vector 208, positive 2 is associated with vector 210, negative 1 is associated with vector 206 and negative 2 is associated with vector 212. The terms "positive" and "negative" refer to the edge of the touchscreen. For example, control circuitry 304 generates for display content identifier 104 and queries the user's preference. A swipe gesture towards the left edge of the touchscreen indicates a positive preference (the user likes content identifier 104) and a swipe gesture towards the right edge of the touchscreen indicates a negative preference (the user dislikes content identifier 104).

For each exemplary swipe gesture recorded in the data structure, control circuitry 304 determines a swipe duration, a swipe direction, and a halt time. Control circuitry 304 may further execute process 700 by determining the reciprocals of the numerical values of each swipe characteristic (e.g., the swipe duration of "positive 1" is converted to ½, the swipe direction of "positive 1" is converted to ⅒, and the halt time of "positive 1" is converted to ½). Control circuitry 304 determines the sum of the reciprocals and assigns the sum as the preference level. For example, control circuitry 304 adds ½+⅒+½ to get a preference value of 1.1. Because this sum is associated with a positive swipe (towards the left edge of the touchscreen), the preference level is kept as a positive number. In contrast, the sum of "negative 1" is also 1.1, but control circuitry 304 determines that the swipe gesture is a negative swipe (made towards the right edge of the touchscreen) and therefore multiplies this value by −1. According to the data structure, the preference level associated with "negative 1" is −1.1.

It should be noted that control circuitry 304 may determine the preference level to be a function of the individual swipe characteristics or any combination of the three swipe characteristics. For example, control circuitry 304 may determine the preference level of "positive 2" to be one of either ¼ (based solely on swipe duration), ¼₅ (based solely on swipe direction), ¼ (based solely on swipe halt time), ¼+¼₅ (based solely on swipe duration and swipe direction), ¼+¼ (based solely on swipe duration and swipe halt time), etc. As discussed previously, control circuitry 304 may multiply each reciprocal by a predetermined multiplier, for normalization purposes, before computing the sum.

Figure 9:
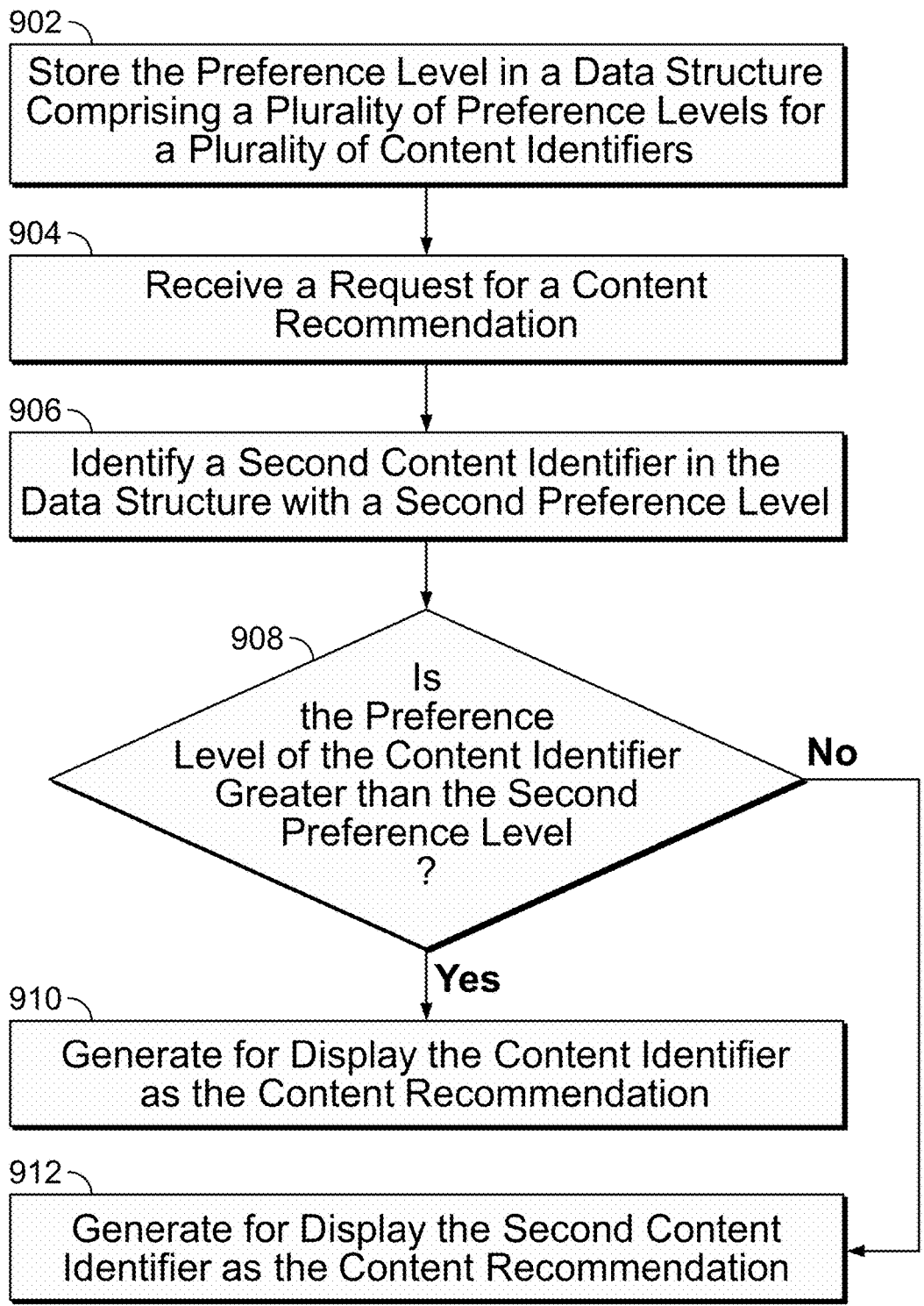
FIG. 9 is a flowchart of an illustrative process for generating content recommendations based on the assigned preference levels, in accordance with some embodiments of the disclosure.

FIG. 9 is a flowchart of illustrative process 900 for generating content recommendations based on the assigned preference levels, in accordance with some embodiments of the disclosure. At 902, control circuitry 304 stores the preference level in a data structure (e.g., in storage 308 of server 406 and/or device 402) comprising a plurality of preference levels for a plurality of content identifiers. An example of such data structure is shown below:

TABLE 7

| User Preferences | |
|---|---|
| Movie | Preference Level |
| Aladdin | 20 |
| The Lion King | 18 |
| Beauty and the Beast | 11 |

At 904, control circuitry 304 receives (e.g., via input interface 310 and/or I/O Path 302) a request for a content recommendation (e.g., a command to generate a user interface of movie recommendations). At 906, control circuitry 304 identifies a second content identifier (e.g., The Lion King) in the data structure with a second preference level (e.g., 18). At 908, control circuitry 304 determines whether the preference level of the content identifier (e.g., Aladdin) is greater than the second preference level. In response to determining that the preference level is not greater than the second preference level, at 912, control circuitry 304 generates for display the second content identifier (e.g., The Lion King) as the content recommendation. In response to determining that the preference level is greater than the second preference level, at 910, control circuitry 304 generates for display the content identifier as the content recommendation. Referring to table 7, because the determined preference level of Aladdin is greater than The Lion King, control circuitry 304 generates for display an identifier, such as a movie poster or a selectable icon accompanied by the movie title, of Aladdin.

It should be noted that processes 500-700 and 900 or any step thereof could be performed on, or provided by, any of the devices shown in FIGS. 3-4. For example, the processes may be executed by control circuitry 304 (FIG. 3) as instructed by a swiping application implemented on device 402 and/or server 406. In addition, one or more steps of a process may be incorporated into or combined with one or more steps of any other process or embodiment (e.g., steps from process 500 may be combined with steps from process 600). In addition, the steps and descriptions described in relation to FIGS. 5-7 and 9 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for determining a preference for content based on swipe characteristics, the method comprising:
    generating for display a content identifier on a touchscreen;
    detecting user contact at a first point on the touchscreen displaying the content identifier;
    while the user contact is maintained on the touchscreen:
        detecting an initiation of a swipe gesture to a second point on the touchscreen, wherein completion of the swipe gesture occurs upon release of the user contact; and
        determining whether the swipe gesture has been temporarily halted for at least a threshold period of time before completion of the swipe gesture at the second point on the touchscreen; and
    in response to determining that the swipe gesture has been temporarily halted for at least the threshold period of time before completion of the swipe gesture at the second point on the touchscreen, assigning to the content identifier a preference level that is a function of an amount of time the swipe gesture is temporarily halted.

2. The method of claim 1, further comprising:
    detecting the release of the user contact from the touchscreen; and
    wherein the assigning of the preference level occurs subsequent to the detection of the release.

3. The method of claim 1, further comprising:
- determining a swipe direction of the swipe gesture, wherein the swipe direction represents an angle formed by (1) a first vector comprising the first point and the second point and (2) a second vector comprising midpoints of parallel edges of the touchscreen; and
- wherein the preference level is a function of both the swipe direction and the amount of time the swipe gesture is temporarily halted.

4. The method of claim 3, wherein swiping towards a first edge of the touchscreen indicates a positive preference for the content identifier and swiping towards a second edge of the touchscreen indicates a negative preference, further comprising:
- determining, based on the angle formed by the first vector and the second vector, whether the swipe direction is towards the first edge; and
- in response to determining that the swipe direction is towards the first edge, increasing the preference level.

5. The method of claim 3, further comprising:
- determining a swipe duration of the swipe gesture, wherein the swipe duration represents a time difference between when the user contact is initiated at the first point and when the user contact is released from the second point; and
- wherein the preference level is a function of the swipe duration, the swipe direction, and the amount of time the swipe gesture is temporarily halted.

6. The method of claim 1, further comprising:
- determining a swipe direction of the swipe gesture, wherein the swipe direction represents an angle formed by (1) a first vector comprising the first point and the second point and (2) a second vector comprising midpoints of parallel edges of the touchscreen;
- determining a swipe duration of the swipe gesture, wherein the swipe duration represents a time difference between when the user contact is initiated at the first point and when the user contact is released from the second point;
- determining that the swipe gesture has not been temporarily halted by detecting the release of the user contact at the second point; and
- in response to determining that the swipe gesture has not been temporarily halted, assigning to the content identifier a preference level that is a function of the swipe duration and the swipe direction.

7. The method of claim 1, further comprising:
- storing the preference level of the content identifier in a data structure comprising a plurality of preference levels for a plurality of content identifiers.

8. The method of claim 7, wherein the content identifier is a first content identifier and the preference level is a first preference level, further comprising:
- receiving a request for a content recommendation;
- identifying, in the data structure, a second content identifier that has a second preference level;
- determining whether the first preference level is greater than the second preference level; and
- in response to determining that the first preference level is greater than the second preference level, generating for display the first content identifier as the content recommendation.

9. The method of claim 7, further comprising:
- sorting the data structure by value of preference level in the plurality of preference levels; and
- generating for display the plurality of content identifiers in order based on the sorting.

10. A system for determining a preference for content based on swipe characteristics, the system comprising:
- display circuitry configured to:
  - generate for display a content identifier on a touchscreen; and
- control circuitry configured to:
  - detect user contact at a first point on the touchscreen displaying the content identifier;
  - while the user contact is maintained on the touchscreen:
    - detect an initiation of a swipe gesture to a second point on the touchscreen, wherein completion of the swipe gesture occurs upon release of the user contact; and
    - determine whether the swipe gesture has been temporarily halted for at least a threshold period of time before completion of the swipe gesture at the second point on the touchscreen; and
  - in response to determining that the swipe gesture has been temporarily halted for at least the threshold period of time before completion of the swipe gesture at the second point on the touchscreen, assign to the content identifier a preference level that is a function of an amount of time the swipe gesture is temporarily halted.

11. The system of claim 10, wherein the control circuitry is further configured to:
- detect the release of the user contact from the touchscreen; and
- wherein the control circuitry is further configured to assign the preference level subsequent to detecting the release.

12. The system of claim 10, wherein the control circuitry is further configured to:
- determine a swipe direction of the swipe gesture, wherein the swipe direction represents an angle formed by (1) a first vector comprising the first point and the second point and (2) a second vector comprising midpoints of parallel edges of the touchscreen; and
- wherein the preference level is a function of both the swipe direction and the amount of time the swipe gesture is temporarily halted.

13. The system of claim 12, wherein swiping towards a first edge of the touchscreen indicates a positive preference for the content identifier and swiping towards a second edge of the touchscreen indicates a negative preference, wherein the control circuitry is further configured to:
- determine, based on the angle formed by the first vector and the second vector, whether the swipe direction is towards the first edge; and
- in response to determining that the swipe direction is towards the first edge, increase the preference level.

14. The system of claim 12, wherein the control circuitry is further configured to:
- determine a swipe duration of the swipe gesture, wherein the swipe duration represents a time difference between when the user contact is initiated at the first point and when the user contact is released from the second point; and
- wherein the preference level is a function of the swipe duration, the swipe direction, and the amount of time the swipe gesture is temporarily halted.

15. The system of claim 10, wherein the control circuitry is further configured to:
- determine a swipe direction of the swipe gesture, wherein the swipe direction represents an angle formed by (1) a first vector comprising the first point and the second point and (2) a second vector comprising midpoints of parallel edges of the touchscreen;

determine a swipe duration of the swipe gesture, wherein the swipe duration represents a time difference between when the user contact is initiated at the first point and when the user contact is released from the second point;

determine that the swipe gesture has not been temporarily halted by detecting the release of the user contact at the second point; and in response to determining that the swipe gesture has not been temporarily halted, assign to the content identifier a preference level that is a function of the swipe duration and the swipe direction.

16. The system of claim 10, wherein the control circuitry is further configured to:

store the preference level of the content identifier in a data structure comprising a plurality of preference levels for a plurality of content identifiers.

17. The system of claim 16, wherein the content identifier is a first content identifier and the preference level is a first preference level, wherein the control circuitry is further configured to:

receive a request for a content recommendation;

identify, in the data structure, a second content identifier that has a second preference level;

determine whether the first preference level is greater than the second preference level; and in response to determining that the first preference level is greater than the second preference level, generate, for display via the display circuitry, the first content identifier as the content recommendation.

18. The system of claim 16, wherein the control circuitry is further configured to:

sort the data structure by value of preference level in the plurality of preference levels; and generate, for display via the display circuitry, the plurality of content identifiers in order based on the sorting.

* * * * *